United States Patent
Qin et al.

(10) Patent No.: US 11,139,706 B2
(45) Date of Patent: Oct. 5, 2021

(54) ELECTRIC MOTOR AND ROTOR THEREOF

(71) Applicant: Johnson Electric International AG, Murten (CH)

(72) Inventors: Ruifeng Qin, Hong Kong (CN); Ning Sun, Shenzhen (CN); Fang Zhang, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 95 days.

(21) Appl. No.: 16/421,047

(22) Filed: May 23, 2019

(65) Prior Publication Data
US 2019/0363594 A1  Nov. 28, 2019

(30) Foreign Application Priority Data
May 23, 2018  (CN) .......................... 201810503210.0

(51) Int. Cl.
| | |
|---|---|
| H02K 1/27 | (2006.01) |
| H02K 1/16 | (2006.01) |
| H02K 1/22 | (2006.01) |
| H02K 16/02 | (2006.01) |
| H02K 1/28 | (2006.01) |

(52) U.S. Cl.
CPC .............. *H02K 1/278* (2013.01); *H02K 1/28* (2013.01); *H02K 16/02* (2013.01)

(58) Field of Classification Search
CPC ........ H02K 1/27; H02K 1/277; H02K 1/2773; H02K 1/274; H02K 1/278; H02K 1/28; H02K 15/03; H02K 16/02
See application file for complete search history.

(56) References Cited

U.S. PATENT DOCUMENTS

| | | | | |
|---|---|---|---|---|
| 7,906,880 | B2 * | 3/2011 | Okubo ................... | H02K 1/278 310/156.25 |
| 2013/0009494 | A1 * | 1/2013 | Oguma ................. | F04D 25/064 310/43 |
| 2013/0257211 | A1 * | 10/2013 | Haga ..................... | H02K 1/278 310/156.12 |

(Continued)

FOREIGN PATENT DOCUMENTS

| | | |
|---|---|---|
| CN | 1985424 A | 6/2007 |
| CN | 101371418 A | 2/2009 |

(Continued)

OTHER PUBLICATIONS

English Machine Translation of the Description of KR101611519B1.
(Continued)

*Primary Examiner* — Tran N Nguyen
(74) *Attorney, Agent, or Firm* — Millman IP Inc.

(57) ABSTRACT

An electric motor and a rotor thereof are provided. The rotor includes a shaft and at least one rotating body fixed to the shaft. The rotating body includes a rotor core and a plurality of permanent magnets. An outer periphery of the rotor core has a plurality of spaced slots, each of which extends along an axial direction of the rotor. The rotating body further includes a plurality of axial arms molded to the corresponding slots and configured to fix the permanent magnets. Every two adjacent axial arms form an accommodation therebetween, and each permanent magnet is fixed to a corresponding accommodation.

17 Claims, 12 Drawing Sheets

(56) References Cited

U.S. PATENT DOCUMENTS

2015/0001978 A1* 1/2015 Haga ................ H02K 1/28
                                                    310/156.12

FOREIGN PATENT DOCUMENTS

| CN | 201219227 Y | 4/2009 |
| CN | 103339830 A | 10/2013 |
| CN | 103620915 A | 3/2014 |
| KR | 101611519 B1 | 4/2016 |

OTHER PUBLICATIONS

English Machine Translation of the Description of CN101371418A.
English Machine Translation of the Description of CN1985424A.
English Machine Translation of the Description of CN103620915A.
English Machine Translation of the Description of CN103339830A.
English Machine Translation of the Description of CN201219227Y.

* cited by examiner

ELECTRIC MOTOR AND ROTOR THEREOF

CROSS REFERENCE TO RELATED APPLICATIONS

This non-provisional patent application claims priority under 35 U. S. C. § 119(a) from Patent Application No. 201810503210.0 filed in The People's Republic of China on May 23, 2018, the entire contents of which are hereby incorporated by reference.

FIELD OF THE INVENTION

This present disclosure relates to a rotor, particularly to a rotor with permanent magnets, and an electric motor employing the rotor.

BACKGROUND OF THE INVENTION

An existing rotor of an electric motor includes a rotor core and a plurality of permanent magnets fixed to an outer periphery of the rotor core by glue. Then, an non-magnetic housing may be mounted to the rotor core to surround the permanent magnets. For example, the rotor core and the permanent magnets are usually mounted with the non-magnetic housing to prevent the permanent magnets from dropping off or breaking, when the electric motor is applied to an electric power steering device.

However, using the glue to fix the permanent magnets to the rotor core has the following problems. On the one hand, the glue is liable to be unevenly coated on the contact surface between the rotor core and the permanent magnets, so it is difficult to ensure adhesion strength therebetween, and thus the radial positions of the permanent magnets is difficult to be ensured. On the other hand, the glue needs a high temperature curing process which takes a lot of time, resulting in a low production efficiency.

SUMMARY

Thus, there a desire for a rotor, of which a plurality of permanent magnets can be fixed without using glue, and an electric motor employing the rotor.

According to one aspect, a rotor is provided, which includes a shaft and at least one rotating body fixed to the shaft, having a rotor core and a plurality of permanent magnets. An outer periphery of the rotor core has a plurality of slots extending along an axial direction of the rotor. The rotating body further includes a plurality of axial arms molded to the corresponding slots and configured to fix the permanent magnets. Every two adjacent axial arms form an accommodation therebetween and each permanent magnet is fixed to a corresponding accommodation.

According to another aspect, an electric motor is provided, which includes a stator and the rotor described above.

In the embodiments of the present disclosure, the permanent magnets can be fixed by a plurality of axial arms molded to the rotor core, so the disadvantages caused by using glue can be avoided, and thus the production efficiency and the reliability of the rotor can be improved.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
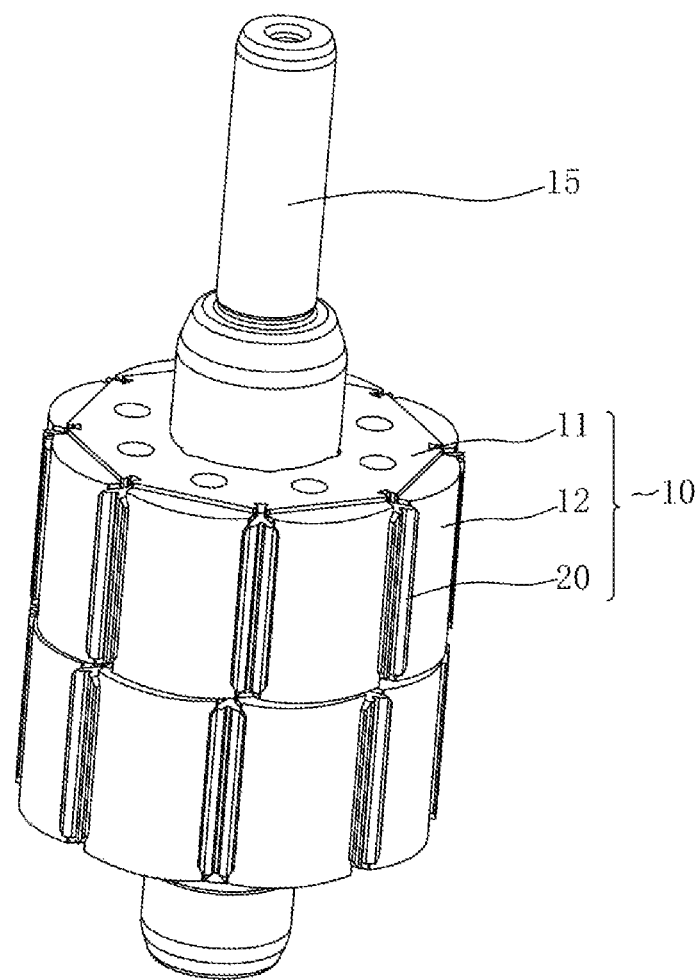
FIG. 1 is a schematic diagram of a rotor for an electric motor according to a first embodiment of the present disclosure.

The subject matter will be described in conjunction with the accompanying drawings and the preferred embodiments. The described embodiments are only a few and not all of the embodiments of the present disclosure. All other embodiments obtained by those ordinarily skilled in the art based on the embodiments of the present disclosure without any creative efforts fall within the protection scope of the present disclosure. It is to be understood that, the drawings are provided for reference only and are not intended to be limiting of the invention. The dimensions shown in the drawings are only for convenience of illustration and are not intended to be limiting.

It should be noted that when a component is considered to be "connected" to another component, it can be directly connected to another component or may also have a centered component. Unless otherwise defined, all technical and scientific terms used herein have the same meaning as commonly understood by those ordinarily skilled in the art. The terminology used in the specification of the present disclosure is only for the purpose of describing particular embodiments and is not intended to limit the invention.

Referring to FIGS. 1 to 4, a rotor of an electric motor according to a first embodiment of the present disclosure includes a shaft 15, and at least one rotating body 10 fixed to the shaft 15. Each rotating body 10 includes a rotor core 11, a plurality of permanent magnets 12 and a plurality of axial arms 20 for holding the permanent magnets 12. In the embodiment, the rotor includes two rotating bodies 10 arranged along an axial direction of the rotor. The two rotating bodies 10 may be offset from each other in a circumferential direction of the rotor.

A plurality of slots 13 extending along the axial direction are arranged at an outer periphery of the rotor core 11 of each rotating body 10 at intervals. The axial arms 20 are respectively molded, preferably injection molded, to the corresponding slots 13. Every two adjacent axial arms 20 form an accommodation 14 therebetween. The permanent magnets 12 are press fitted to the corresponding accommodations 14. In the embodiment, the slots 13 of the two adjacent rotating bodies 10 are offset from each other in the circumferential direction. The axial arm 20 is made of plastic material, preferably made of resin. Preferably, an axial length of each axial arm 20 is smaller than an axial length of each slot 13.

Since the permanent magnets 12 are fixed by the axial arms 20 molded to the rotor core 11, so the disadvantages caused by using glue to attach the permanent magnets can be avoided, and thus the production efficiency and the reliability of the rotor can be improved.

Preferably, the rotor core 11 is constituted by a plurality of laminations 114 axially stacked together. Each lamination 114 may be in a shape of regular polygon, and the slots 13 are respectively formed at corners of the regular polygon. In the embodiment, the lamination 114 is in a shape of regular octagon, with eight slots 12. However, it should be understood that the lamination 114 is not limited to the regular octagon, and the number of the sides and the number of the slots 13 can be adjusted according to the number of the permanent magnets 12.

Figure 5:
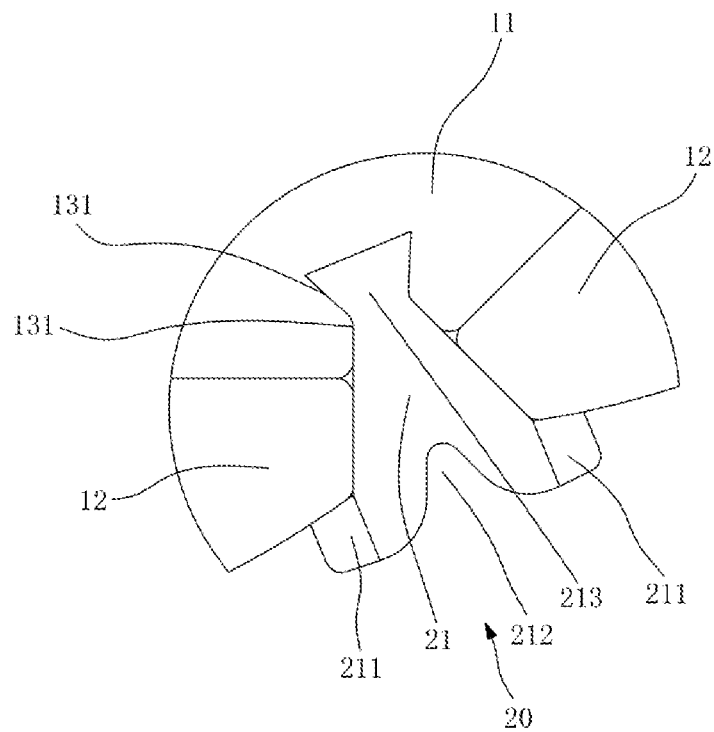
FIG. 5 is a partially enlarged view of FIG. 2 at portion A.

Referring to FIG. 5, a section of the slot 13 may include a dovetail portion 131, to make the axial arm 20 stably molded to the slot 13 and prevent the axial arm 20 from dropping off. In the embodiment, the section of the slot 13 includes two dovetail portions 131 which are reversely connected in a radial direction of the rotor core 11. It should be understood that the section of the slot 13 may be in other shapes.

In the embodiment, the axial arm 20 includes a body portion 21, a fitting portion 213 extending inward from a radially inner side of the body portion 21, and two limiting portions 211 respectively extending along opposite circumferential directions from a radially outer side of the body portion 21. The fitting portion 213 is molded inside the slot 13 of the rotor core 11, with a shape that matches the slot 13.

Preferably, the axial arm 30 further includes a constricted portion 212 formed between the two limiting portions 211. The constricted portion 212 may be slightly deformed when the permanent magnet 12 is mounted into the accommodation 14. The constricted portion 212 may be a recess extending inward from the radially outer side of the body portion 21, and consequently, the axial arm 20 has a substantially Y-shaped section.

In an alternative embodiment, the axial arm 20 also may have a T-shaped section, as long as the axial arm 20 has one portion molded inside the slot 13 and another portion cooperating with the rotor core 11 to form the accommodation 14. The constricted portion 212 also may be a hole that passes through the body portion 21 in the axial direction, so that the hole may be slightly deformed when the body portion 21 is pressed.

Figure 2:
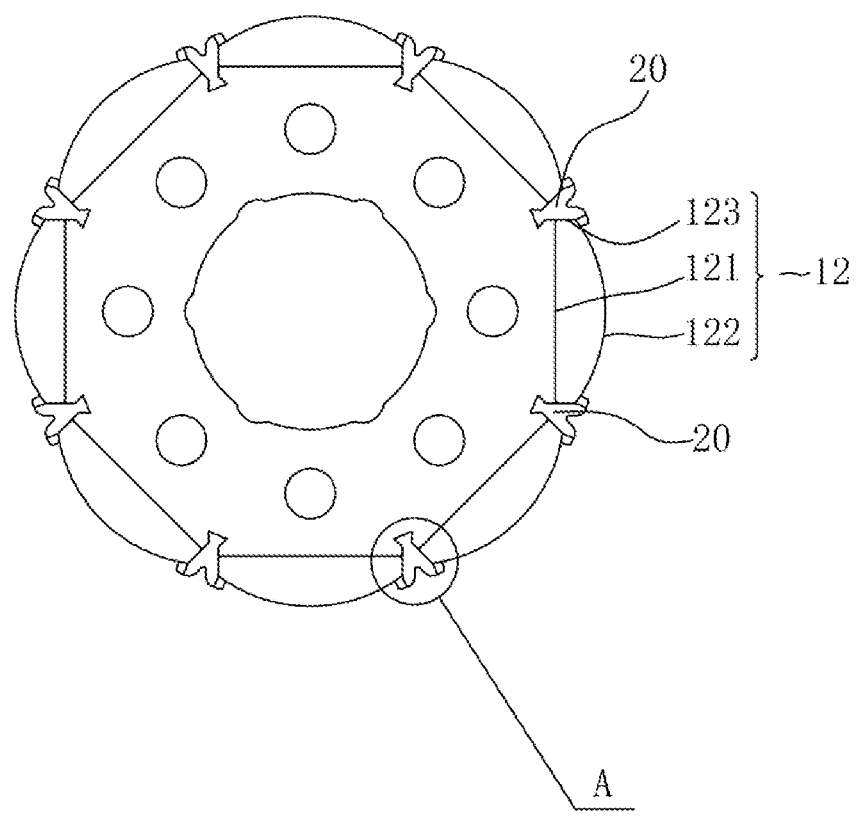
FIG. 2 is a top view of one of rotating bodies of the rotor of FIG. 1.
Figure 3:
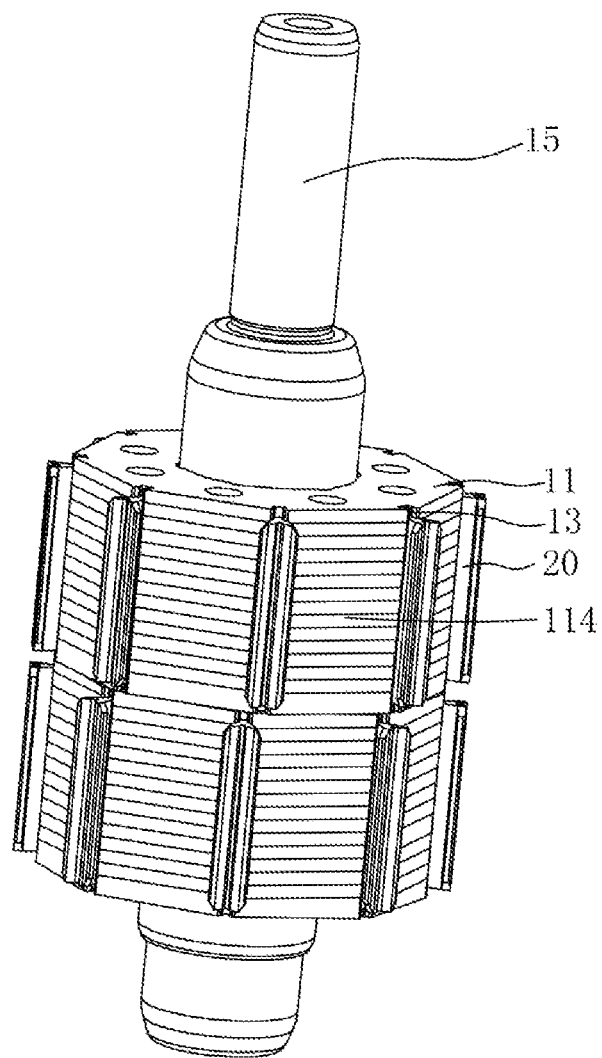
FIG. 3 is another schematic diagram of the rotor of FIG. 1, with a plurality of permanent magnets removed.
Figure 4:
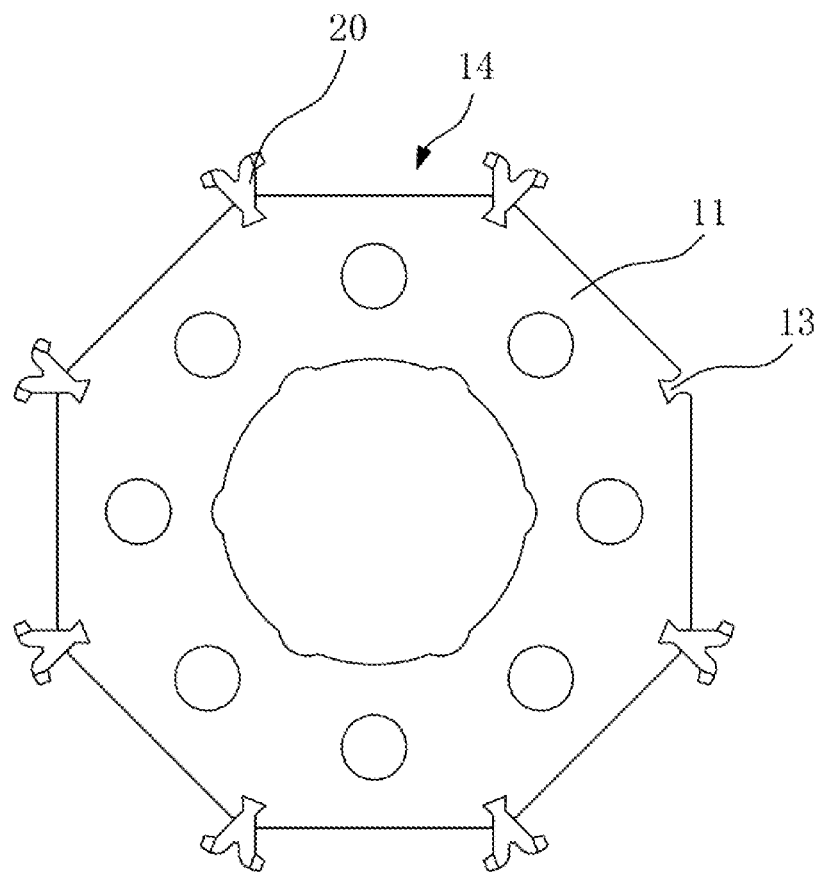
FIG. 4 is another top view of one of rotating bodies of the rotor of FIG. 1, with a plurality of permanent magnets and one axial arm removed.
Figure 6:
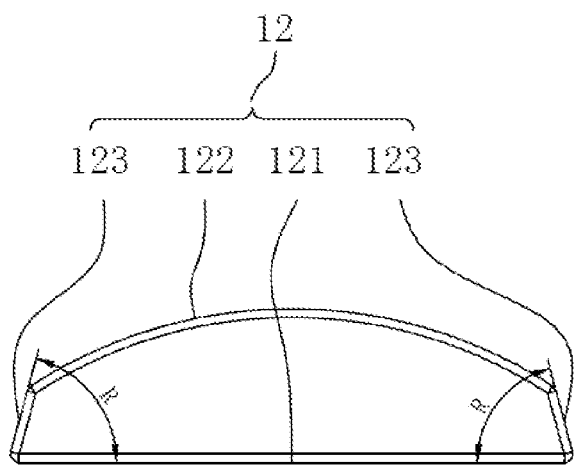
FIG. 6 is a top view of a permanent magnet according to a preferably embodiment of the present disclosure.
Figures 7A, 7B:
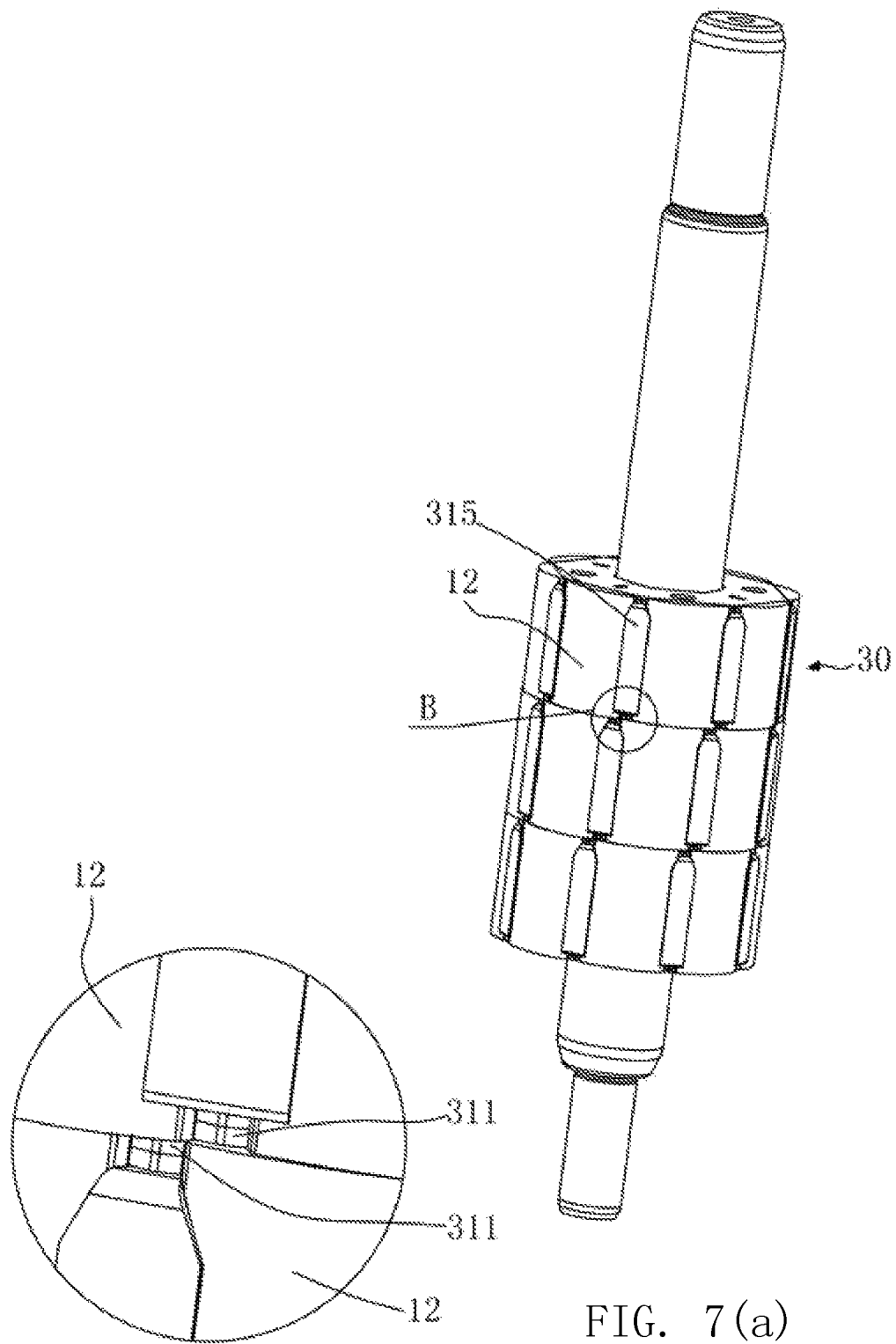
FIG. 7(a) is a schematic diagram of a rotor of an electric motor according to a second embodiment of the present disclosure.
FIG. 7(b) is a partially enlarged view of FIG. 7(a) at portion B.
Figure 8:
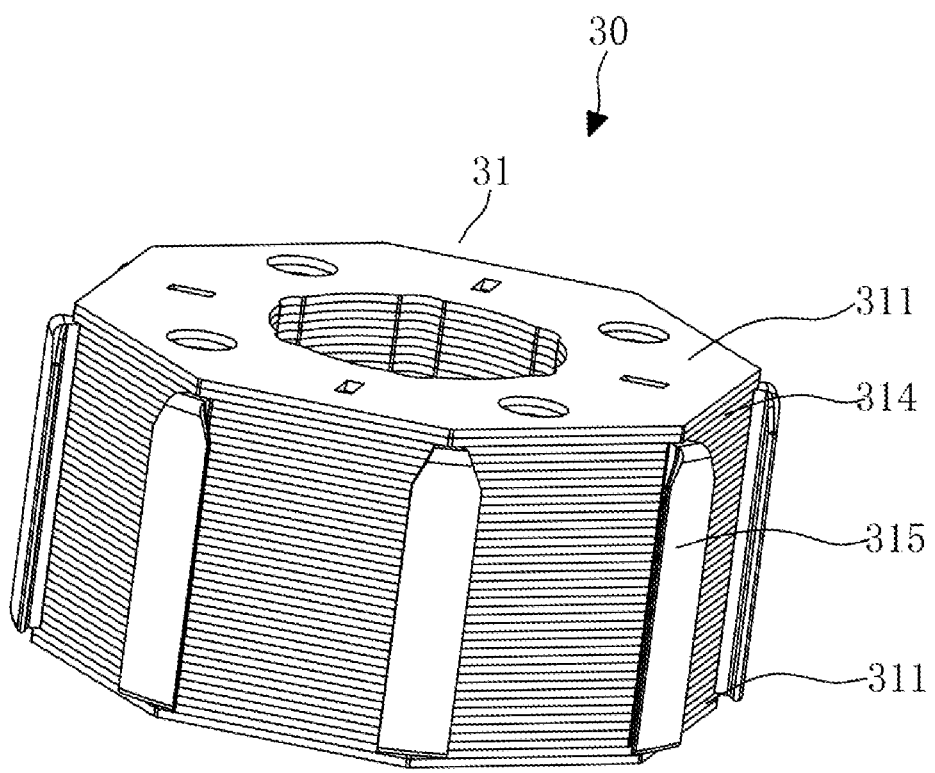
FIG. 8 is a schematic diagram of one of the rotating bodies of the rotor of FIG. 7(a), with a plurality of permanent magnets and a part of axial arms removed.
Figure 9:
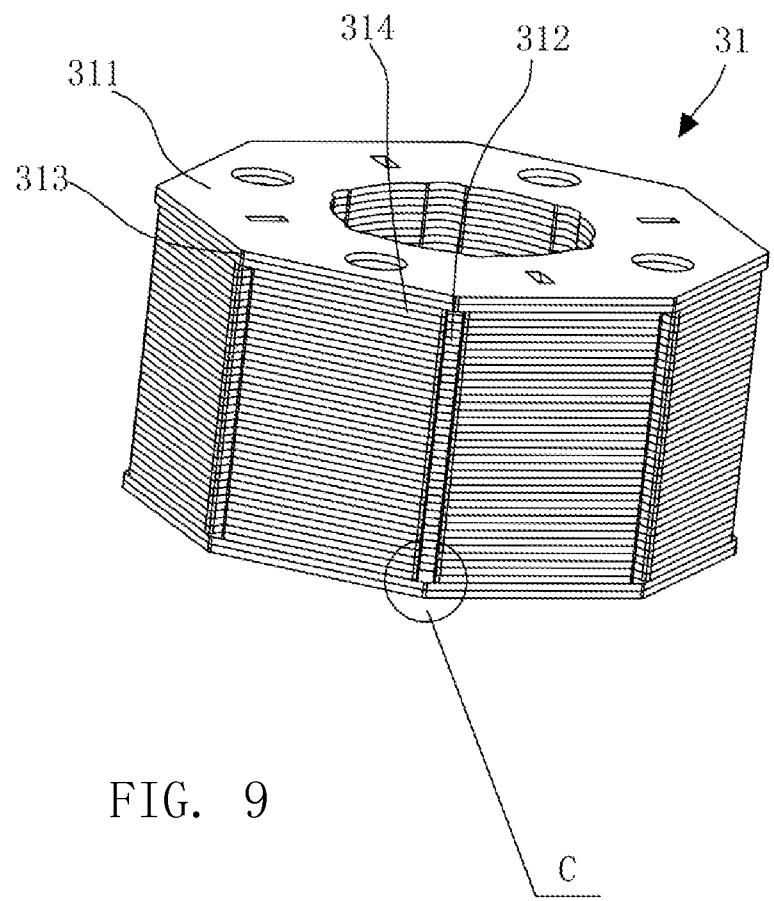
FIG. 9 is a schematic diagram of the rotor core of the rotating body of FIG. 8.
Figure 10:
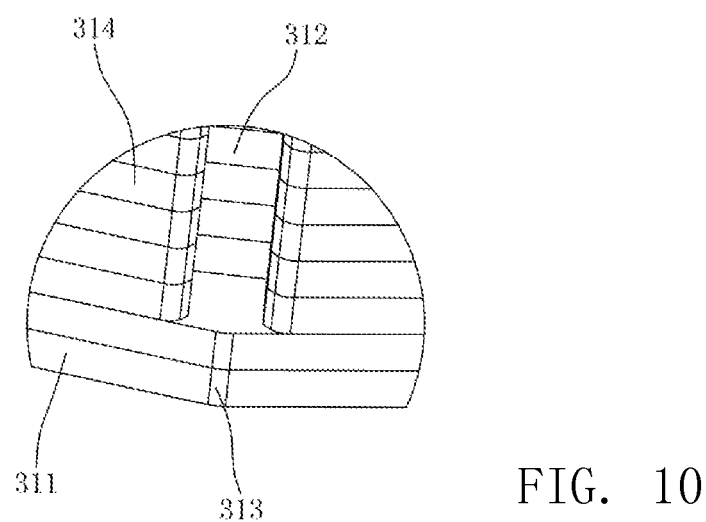
FIG. 10 is a partially enlarged view of FIG. 9 at a portion C.

Referring to FIG. 2 and FIG. 6, the permanent magnet 12 includes an inner surface 121, an outer surface 122, and two side surfaces 123 connected between the inner surface 121 and the outer surface 122. In the embodiment, the inner surface 121 is a plane in contact with an outer surface of the rotor core 11. The outer surface 122 is a convex curved surface. In the embodiment, the body portions 21 bear against the side surfaces 123 of the permanent magnets 12 to limit a circumferential movement of the permanent magnets 12. The limiting portions 211 bear against the outer surfaces 122 of the permanent magnets 12 to limit a radial movement of the permanent magnets 12. An angle R formed between the side surface 123 and the inner surface 121 may be less than or equal to 90 degrees. Preferably, the angle R is greater than or equal to 45 degrees, and less than 90 degrees, so that the axial arm 20 is in sufficient contact with the side surface 123 and partial outer surface 122 of the permanent magnet 12.

Referring to FIGS. 7(a) to 10, a rotating body 30 according to a second embodiment of the present disclosure is similar to the rotating body 10 of the first embodiment, and the main difference therebetween is that the rotor core 31 of the rotating body 30 further includes at least one end lamination 311, which is stacked at one axial end of the laminations. The end lamination 311 has a plurality of blocking portions 313 respectively corresponding to the slots 312 of the rotor core 31. The shape of the end lamination 311 is substantially the same as that of the other laminations 314, except that the end lamination 311 does not have the slot 312. For example, the shape of the end lamination 311 may be in a shape of regular polygon, which includes a plurality of corners and a plurality of sides. The corners are respectively corresponding to the slots 312 to form the blocking portions 313, and the sides are respectively aligned with the sides of the other laminations 314. The end lamination 311 is configured to limit an axial flow of plastic material during injection molding the axial arm 315, so the mold can be simplified and thus reducing the cost.

Preferably, both axial ends of the rotor core 31 have at least one end lamination 311, to define an axial region of plastic material during injection molding the axial arm, so the mold can be further simplified. An axial length of the axial arm 20 is equal to an axial length of the slot 13. In the embodiment, each axial end of the rotor core 31 has two end laminations 311.

A rotor of an electric motor according to a second embodiment of the present disclosure includes three rotating bodies 30 arranged along the axial direction. Adjacent rotating bodies 30 may be offset from each other along the circumferential direction of the rotor, so that the corners of the adjacent rotating bodies 30 are staggered in the circumferential direction and the adjacent rotor cores are not completely overlapped, and thus the adjacent rotor cores are able to avoid an axial movement of the permanent magnets and prevent the permanent magnets 12 from being pressed against each other in the axial direction. In the embodiment, in a rotating body, an axial length of the permanent magnet 12 is equal to or slightly smaller than an axial length of the rotor core 31 having the end lamination 311.

Figure 11:
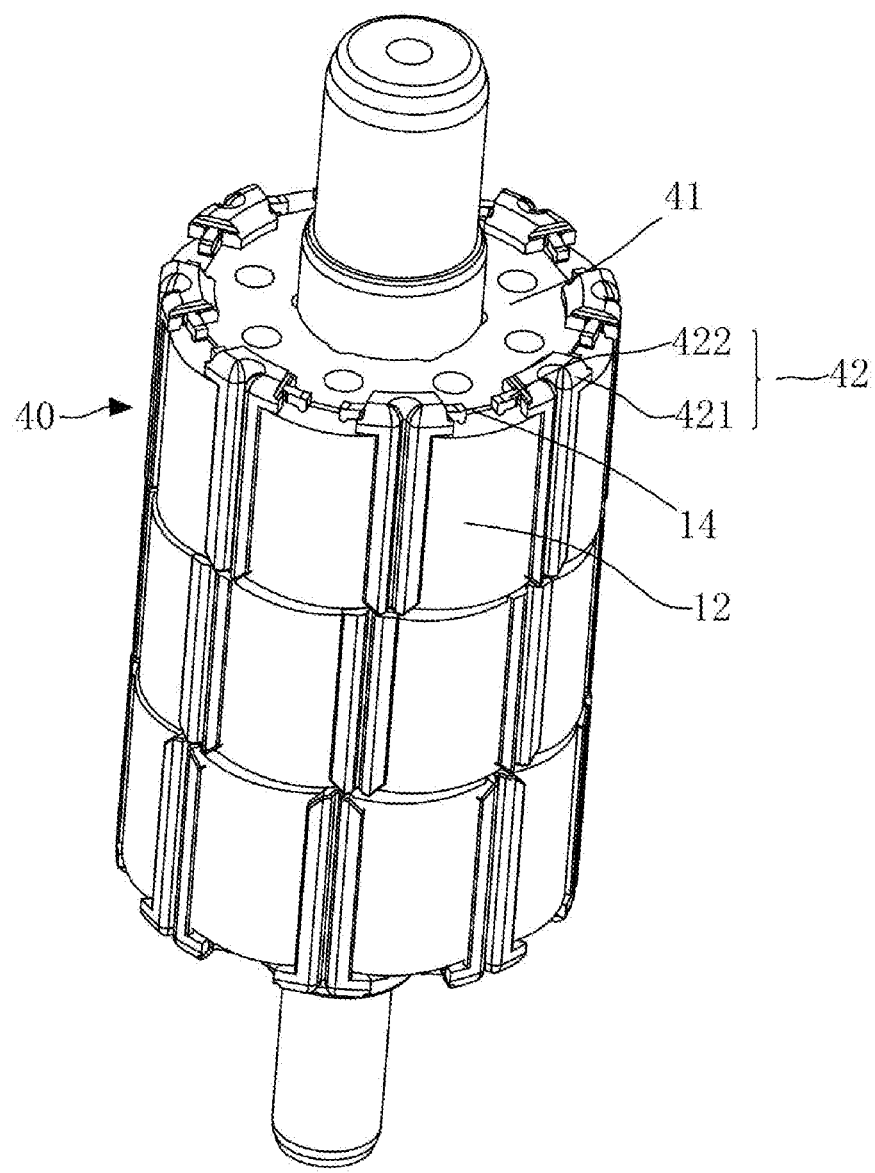
FIG. 11 is a schematic diagram of a rotor for an electric motor according to a third embodiment of the present disclosure.
Figure 12:
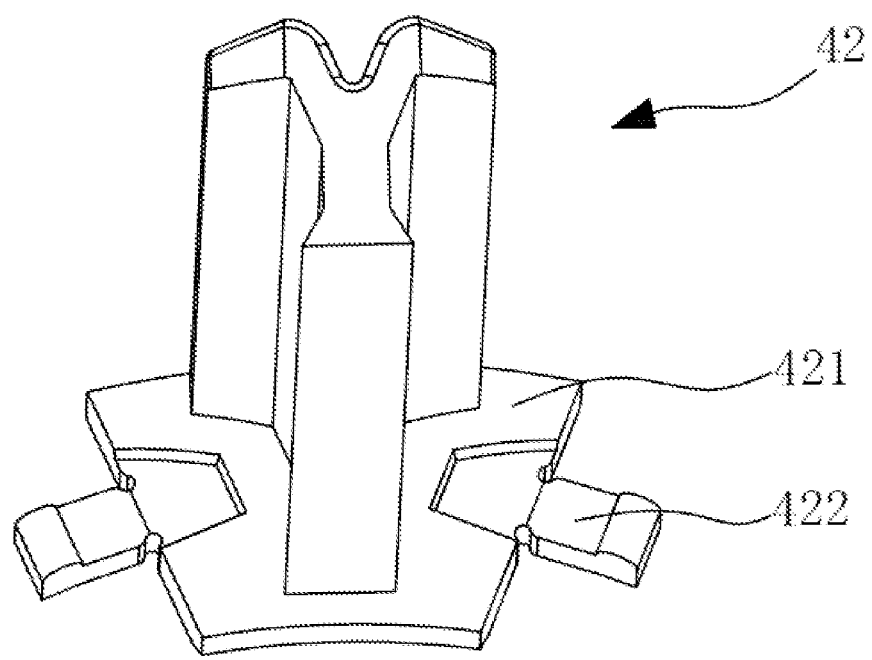
FIG. 12 is a schematic diagram of an axial arm of FIG. 11.

Referring to FIGS. 11 to 12, a rotating body according to a third embodiment of the present disclosure is similar to the rotating body 10 of the first embodiment, and the main difference therebetween is that the axial arm 42 of the rotating bodies 40 arranged at two axial ends of the rotor further includes two end walls 421 formed at an axial end of the axial arm 42. The two end walls 421 are arranged at two circumferential sides of the body portion of the axial arm 42, and substantially perpendicular to the body portion. A portion of the end wall 421 is corresponding to rotor core 411, and another portion of the end wall 421 is corresponding to the permanent magnet 12. The end wall 421 may further include a supporting wall 422 which is preferably elastic. The supporting wall 422 extends obliquely from the end wall 42 towards the accommodation 14, with an end extending inside the accommodation 14. That is, the supporting wall 422 is partially overlapped with the rotor core 411 in the axial direction. An axial length of the permanent magnet 12 is smaller than an axial length of the rotor core 411. The supporting walls 422 are configured to support the permanent magnets 12, so that the permanent magnets 12 of the same rotating body are located at the same axial position.

Figure 13A:
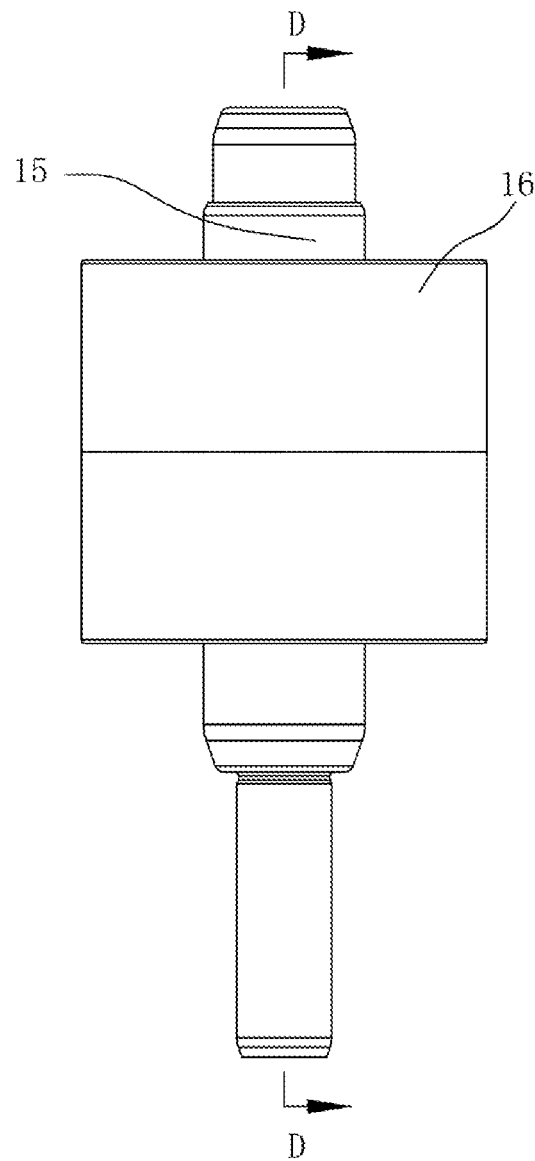
FIG. 13(a) is a schematic diagram of a rotor for an electric motor according to a fourth embodiment of the present disclosure.
Figure 13B:
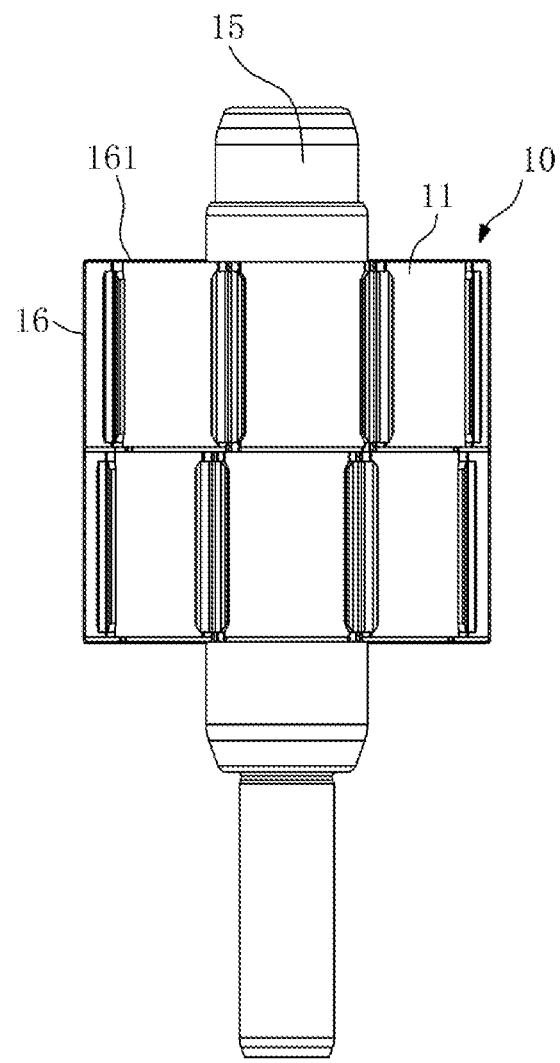
FIG. 13(b) is a sectional view of FIG. 13(a), taken along a line D-D thereof.

Referring to FIGS. 13(*a*) to 13(*b*), a rotating body according to a fourth embodiment of the present disclosure is similar to the rotating body 10 of the first embodiment, and the main difference therebetween is that the rotor further includes an non-magnetic housing 16 sleeved on the outer periphery of the rotating bodies 10. In the embodiment, the non-magnetic housing 16 is made in two parts, which are mounted to the rotating bodies 10 from two axial ends of the shaft 15, respectively. The shape of the non-magnetic housing 16 is substantially corresponding to the shape of the rotating bodies 10. For example, the rotating bodies 10 are substantially cylindrical, so the non-magnetic housing 16 is also substantially cylindrical. The non-magnetic housing 16 can be made of nonmagnetic steel, such as mild steel. The non-magnetic housing 16 may be directly formed by stamping, or may be formed by rolling a stamping sheet into a hollow cylinder.

Each housing part may be formed with a flange 161 extending radially inward from an axial end of the housing part, to further limit an axial movement of the rotating bodies 10. The flanges 161 may be formed with the housing parts by stamping before the housing parts are mounted to the rotor bodies 10, or formed after the housing parts are mounted to the rotor bodies 10.

Figure 14:
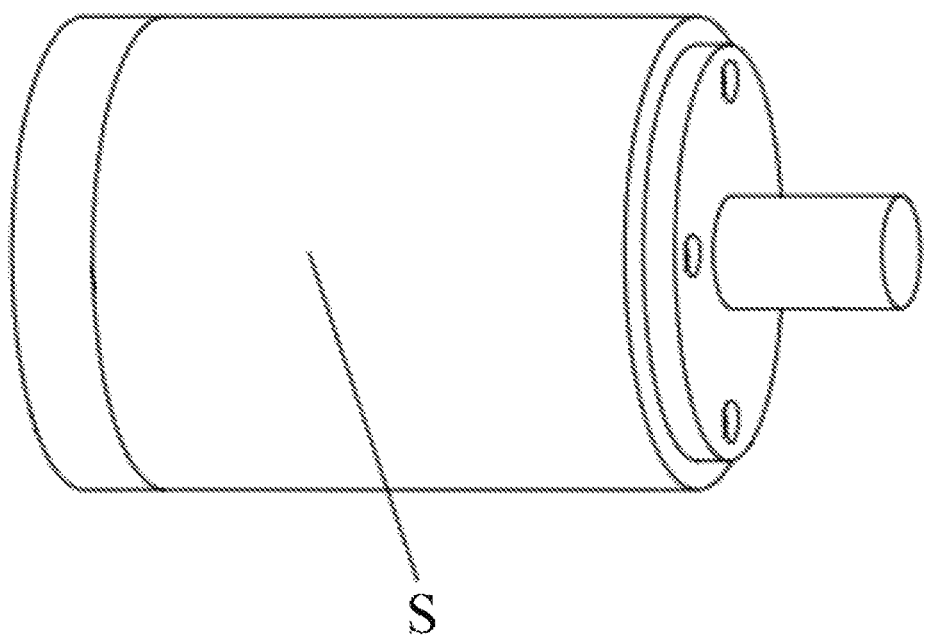
FIG. 14 is a schematic diagram of an electric motor according to a preferably embodiment of the present disclosure.

An electric motor shown in FIG. 14 includes a stator S and a rotor, which can be the rotor described in the above embodiments.

The above descriptions are only preferred embodiments of the present disclosure, and are not to limit the present disclosure. Any changes, equivalents, modifications and the like, which are made within the spirit and principle of the present disclosure, shall fall within the protection scope of the present disclosure.

The invention claimed is:

1. A rotor of an electric motor, comprising:
a shaft; and
at least one rotating body fixed to the shaft, comprising a rotor core and a plurality of permanent magnets;
wherein an outer periphery of the rotor core has a plurality of spaced slots, each of which extends along an axial direction of the rotor, the rotating body further comprises a plurality of axial arms molded to the corresponding slots and configured to fix the permanent magnets, every two adjacent axial arms form an accommodation therebetween, and each permanent magnet is fixed to a corresponding accommodation; and
the rotor core comprises a plurality of first laminations axially stacked together and at least one second lamination which is stacked at one axial end of the first laminations and aligned with the first laminations in a circumferential direction of the rotor, the first laminations have the plurality of spaced slots, and the at least one second lamination has a plurality of blocking portions corresponding to the plurality of spaced slots.

2. The rotor according to claim 1, wherein the axial arm comprises a body portion, a fitting portion extending inward from a radially inner side of the body portion, and two limiting portions respectively extending along opposite circumferential directions from a radially outer side of the body portion, the fitting portion being molded to the slot of the rotor core.

3. The rotor according to claim 2, wherein the body portion bears against a side surface of the permanent magnet to limit a circumferential movement, and the limiting portion bears against an outer surface of the permanent magnet to limit a radial movement.

4. The rotor according to claim 1, wherein each of the first laminations is in a shape of polygon, and the plurality of spaced slots are formed at corners of the polygon.

5. The rotor according to claim 1, wherein the shape of the at least one second lamination is substantially the same as the shape of the first lamination.

6. The rotor according to claim 1, wherein the rotor core further comprises at least one third lamination which is stacked at the other axial end of the first laminations and aligned with the first laminations in the circumferential direction, the at least one third lamination has a plurality of second blocking portions corresponding to the plurality of spaced slots, and the at least one second lamination and the at least one third lamination define an axial region for injection molding the axial arm.

7. The rotor according to claim 1, wherein the rotor comprises at least two rotating bodies arranged along the axial direction of the rotor, and adjacent rotating bodies are offset from each other along a circumferential direction of the rotor.

8. The rotor according to claim 7, wherein an axial length of the permanent magnet is equal to or smaller than an axial length of a corresponding rotor core.

9. The rotor according to claim 1, wherein the permanent magnet comprises an inner surface being in contact with an outer surface of the rotor core, a curved outer surface opposite to the inner surface, and two side surfaces connected between the inner surface and the curved outer surface, and an angle formed between the side surface and the inner surface being greater than or equal to 45 degrees, and less than or equal to 90 degrees.

10. The rotor according to claim 1, wherein the axial arm comprises two end walls for supporting the permanent magnets, and the two end walls extending from an axial end of the axial arm and being located at two circumferential sides of the axial arm.

11. The rotor according to claim 10, wherein the rotor comprises at least two rotating bodies arranged along the axial direction of the rotor, the axial arm of two rotating bodies arranged at two axial ends of the rotor has the two end walls.

12. The rotor according to claim 10, wherein the end wall is elastic and extends towards the accommodation, with an end extending inside the accommodation.

13. An electric motor, comprising:
a stator;
a rotor, comprising:
a shaft; and
at least one rotating body fixed to the shaft, comprising a rotor core and a plurality of permanent magnets;

wherein an outer periphery of the rotor core has a plurality of spaced slots, each of which extends along an axial direction of the rotor, the rotating body further comprises a plurality of axial arms molded to the corresponding slots and configured to fix the permanent magnets, every two adjacent axial arms form an accommodation therebetween, and each permanent magnet is fixed to a corresponding accommodation; and the rotor core comprises a plurality of first laminations axially stacked together and at least one second lamination which is stacked at one axial end of the first laminations and aligned with the first laminations in a circumferential direction of the rotor, the first laminations have the plurality of spaced slots, and the at least one second lamination has a plurality of blocking portions corresponding to the plurality of spaced slots.

14. The motor according to claim 13, wherein the rotor core further comprises at least one third lamination which is stacked at the other axial end of the first laminations and aligned with the first laminations in the circumferential direction, the at least one third lamination has a plurality of second blocking portions corresponding to the plurality of spaced slots, and the at least one second lamination and the at least one third lamination define an axial region for injection molding the axial arm.

15. The motor according to claim 14, wherein each of the first laminations is in a shape of polygon, and the plurality of spaced slots are formed at corners of the polygon.

16. The motor according to claim 15, wherein the shape of the at least one second lamination and the at least one third lamination is substantially the same as the shape of the first lamination.

17. The rotor according to claim 6, wherein each of the first laminations is in a shape of polygon, the plurality of spaced slots are formed at corners of the polygon, and the shape of the at least one third lamination is substantially the same as the shape of the first lamination.

* * * * *